(12) United States Patent
Ko et al.

(10) Patent No.: US 10,182,356 B2
(45) Date of Patent: Jan. 15, 2019

(54) METHOD AND APPARATUS FOR SELECTING BEAM IN WIRELESS COMMUNICATION SYSTEM SUPPORTING BEAMFORMING SCHEME

(71) Applicants: Samsung Electronics Co., Ltd., Gyeonggi-do (KR); Korea University Research and Business Foundation, Seoul (KR)

(72) Inventors: Young-Chai Ko, Seoul (KR); Myeong-Jin Kim, Gangwon-do (KR)

(73) Assignees: Samsung Electronics Co., Ltd., Suwon-si (KR); Korea University Research and Business Foundation, Seoul (KR)

( * ) Notice: Subject to any disclaimer, the term of this patent is extended or adjusted under 35 U.S.C. 154(b) by 126 days.

(21) Appl. No.: 15/087,659

(22) Filed: Mar. 31, 2016

(65) Prior Publication Data
US 2016/0295554 A1 Oct. 6, 2016

(30) Foreign Application Priority Data
Mar. 31, 2015 (KR) .................. 10-2015-0045433

(51) Int. Cl.
*H04B 7/06* (2006.01)
*H04B 7/08* (2006.01)
*H04W 24/02* (2009.01)

(52) U.S. Cl.
CPC .......... *H04W 24/02* (2013.01); *H04B 7/0695* (2013.01); *H04B 7/088* (2013.01)

(58) Field of Classification Search
CPC ..................................................... H04W 24/02
USPC ........................................................... 370/329
See application file for complete search history.

(56) References Cited

U.S. PATENT DOCUMENTS

| | | | |
|---|---|---|---|
| 8,644,184 B1* | 2/2014 | Zhang ............... | H04B 7/0626 370/252 |
| 2002/0049952 A1* | 4/2002 | Lee .................. | H03M 13/2957 714/786 |
| 2007/0135139 A1* | 6/2007 | Avidor .............. | H04B 7/0452 455/456.5 |
| 2008/0165875 A1* | 7/2008 | Mundarath ........ | H04B 7/0417 375/262 |
| 2009/0233545 A1* | 9/2009 | Sutskover .......... | H01Q 3/26 455/25 |
| 2012/0039196 A1* | 2/2012 | Zhang ............... | H04L 25/03343 370/252 |

(Continued)

*Primary Examiner* — Peter G Solinsky (57) ABSTRACT

The present disclosure relates to a pre-5th-generation (5G) or 5G communication system to be provided for supporting higher data rates beyond 4th-generation (4G) communication system such as a long term evolution (LTE). A method for selecting a radio frequency beam by a receiving apparatus in a wireless communication system supporting a beamforming scheme includes determining a number of reference signal intervals in which a reference signal is transmitted based on a number of transmitting apparatuses, estimating full channel information by repetitively performing a partial channel estimating based on the number of reference signal intervals, and selecting a reception RF beam and a transmission RF beam for each of the transmitting apparatuses based on the full channel information.

20 Claims, 7 Drawing Sheets

(56) References Cited

U.S. PATENT DOCUMENTS

| | | | |
|---|---|---|---|
| 2012/0218141 A1* | 8/2012 | Vasavada | H01Q 3/267 |
| | | | 342/354 |
| 2013/0201908 A1* | 8/2013 | Ashikhmin | H04W 52/241 |
| | | | 370/328 |
| 2014/0153625 A1* | 6/2014 | Vojcic | H04L 1/005 |
| | | | 375/224 |
| 2014/0355707 A1 | 12/2014 | Kim et al. | |
| 2014/0376355 A1* | 12/2014 | Kudo | H04B 7/0456 |
| | | | 370/203 |
| 2015/0003325 A1* | 1/2015 | Sajadieh | H04B 7/0452 |
| | | | 370/328 |
| 2015/0168537 A1* | 6/2015 | Amizur | G01S 5/021 |
| | | | 455/456.2 |
| 2016/0127114 A1* | 5/2016 | Kim | H04B 17/345 |
| | | | 370/252 |
| 2016/0212643 A1* | 7/2016 | Park | H04B 7/0626 |
| 2017/0093474 A1* | 3/2017 | Lee | H04B 7/0486 |
| 2017/0201999 A1* | 7/2017 | Kang | H04W 72/085 |
| 2017/0231010 A1* | 8/2017 | Jung | H04W 74/0833 |
| 2018/0083681 A1* | 3/2018 | Faxer | H04B 7/0413 |

\* cited by examiner

METHOD AND APPARATUS FOR SELECTING BEAM IN WIRELESS COMMUNICATION SYSTEM SUPPORTING BEAMFORMING SCHEME

CROSS-REFERENCE TO RELATED APPLICATION AND CLAIM OF PRIORITY

The present application is related to and claims benefit under 35 U.S.C. § 119(a) of a Korean patent application filed in the Korean Intellectual Property Office on Mar. 31, 2015 and assigned Serial No. 10-2015-0045433, the entire disclosure of all of which is incorporated herein by reference.

TECHNICAL FIELD

The present disclosure relates to an apparatus and method for selecting a beam in a wireless communication system supporting a beamforming scheme, and more particularly, to an apparatus and method for selecting a beam based on an effective channel in a wireless communication system supporting a beamforming scheme.

BACKGROUND

To meet the demand for wireless data traffic, which has increased since deployment of 4th-generation (4G) communication systems, efforts have been made to develop an improved 5th-generation (5G) or pre-5G communication system. Therefore, the 5G or pre-5G communication system is also called a 'beyond 4G network' or a 'post long-term evolution (LTE) system'.

It is considered that the 5G communication system will be implemented in millimeter wave (mmWave) bands, e.g., 60 GHz bands, so as to accomplish higher data rates. To reduce propagation loss of radio waves and increase a transmission distance, a beam forming technique, a massive multiple-input multiple-output (MIMO) technique, a full dimensional MIMO (FD-MIMO) technique, an array antenna technique, an analog beam forming technique, and a large scale antenna technique are discussed in 5G communication systems.

In addition, in 5G communication systems, development for system network improvement is under way based on advanced small cells, cloud radio access networks (RANs), ultra-dense networks, a device-to-device (D2D) communication, a wireless backhaul, a moving network, a cooperative communication, coordinated multi-points (CoMP), reception-end interference cancellation, and the like.

In the 5G system, a hybrid frequency shift keying (FSK) and quadrature amplitude modulation (QAM) modulation (FQAM) and a sliding window superposition coding (SWSC) as an advanced coding modulation (ACM) scheme, and a filter bank multi carrier (FBMC) scheme, a non-orthogonal multiple Access (NOMA) scheme, and a sparse code multiple access (SCMA) scheme as an advanced access technology have been developed.

In a receiving apparatus which does not include K analog digital converters (ADCs) even though using a plurality of antennas, a plurality of signals received by the plurality of antennas are combined, and the combined signal is input to an ADC. So, it is impossible to acquire channel information for all of the antennas at the same time. Here, K is not equal to the number of antennas. For enhancing system performance, the channel information for all of the antennas is required. So, there is a need for a scheme for acquiring the channel information for all of the antennas.

Meanwhile, in a system using an effective channel as a form which is generated by multiplying a channel and a factor of a radio frequency (RF) beam, system performance is determined according to RF beam selection. A transmitting apparatus and a receiving apparatus which may use a plurality of RF beams may consider all possible RF beam combinations in order to search an RF beam which may acquire optimal performance.

If the transmitting apparatus and the receiving apparatus consider all possible RF beam combinations, system complexity for RF beam search increases, and time required for the RF beam search increases.

So, there is a need for a RF beam searching method which decreases system complexity and time required for RF beam search, and enhances performance.

The above information is presented as background information only to assist with an understanding of the present disclosure. No determination has been made, and no assertion is made, as to whether any of the above might be applicable as prior art with regard to the present disclosure.

SUMMARY

To address the above-discussed deficiencies, it is a primary object to provide at least the advantages described below. Accordingly, an aspect of the present disclosure is to propose an apparatus and method for selecting a beam in a wireless communication system supporting a beamforming scheme.

Another aspect of the present disclosure is to propose an apparatus and method for selecting a beam based on an effective channel in a wireless communication system supporting a beamforming scheme.

Another aspect of the present disclosure is to propose an apparatus and method for selecting a beam thereby decreasing system complexity in a wireless communication system supporting a beamforming scheme.

Another aspect of the present disclosure is to propose an apparatus and method for selecting a beam thereby decreasing time required for selecting the beam in a wireless communication system supporting a beamforming scheme.

Another aspect of the present disclosure is to propose an apparatus and method for selecting a beam thereby enhancing performance in a wireless communication system supporting a beamforming scheme.

In accordance with an aspect of the present disclosure, a method for selecting a radio frequency (RF) beam by a receiving apparatus in a wireless communication system supporting a beamforming scheme is provided. The method includes determining a number of reference signal intervals in which a reference signal is transmitted based on a number of transmitting apparatuses; estimating full channel information by repetitively performing a partial channel information estimating operation based on the number of reference signal intervals; and selecting a reception RF beam and a transmission RF beam for each of the transmitting apparatuses based on the full channel information.

In accordance with another aspect of the present disclosure, a receiving apparatus in a wireless communication system supporting a beamforming scheme is provided. The receiving apparatus includes a channel estimator configured to determine a number of reference signal intervals in which a reference signal is transmitted based on a number of transmitting apparatuses, and estimate full channel information by repetitively performing a partial channel information estimating operation based on the number of reference signal intervals; and a radio frequency (RF) beam selector configured to select a reception RF beam and a transmission RF beam for each of the transmitting apparatuses based on the full channel information.

Other aspects, advantages, and salient features of the disclosure will become apparent to those skilled in the art from the following detailed description, which, taken in conjunction with the annexed drawings, discloses exemplary embodiments of the disclosure.

Before undertaking the DETAILED DESCRIPTION below, it may be advantageous to set forth definitions of certain words and phrases used throughout this patent document: the terms "include" and "comprise," as well as derivatives thereof, mean inclusion without limitation; the term "or," is inclusive, meaning and/or; the phrases "associated with" and "associated therewith," as well as derivatives thereof, may mean to include, be included within, interconnect with, contain, be contained within, connect to or with, couple to or with, be communicable with, cooperate with, interleave, juxtapose, be proximate to, be bound to or with, have, have a property of, or the like; and the term "controller" means any device, system or part thereof that controls at least one operation, such a device may be implemented in hardware, firmware or software, or some combination of at least two of the same. It should be noted that the functionality associated with any particular controller may be centralized or distributed, whether locally or remotely. Definitions for certain words and phrases are provided throughout this patent document, those of ordinary skill in the art should understand that in many, if not most instances, such definitions apply to prior, as well as future uses of such defined words and phrases.

Before undertaking the DETAILED DESCRIPTION below, it may be advantageous to set forth definitions of certain words and phrases used throughout this patent document: the terms "include" and "comprise," as well as derivatives thereof, mean inclusion without limitation; the term "or," is inclusive, meaning and/or; the phrases "associated with" and "associated therewith," as well as derivatives thereof, may mean to include, be included within, interconnect with, contain, be contained within, connect to or with, couple to or with, be communicable with, cooperate with, interleave, juxtapose, be proximate to, be bound to or with, have, have a property of, or the like; and the term "controller" means any device, system or part thereof that controls at least one operation, such a device may be implemented in hardware, firmware or software, or some combination of at least two of the same. It should be noted that the functionality associated with any particular controller may be centralized or distributed, whether locally or remotely. Definitions for certain words and phrases are provided throughout this patent document, those of ordinary skill in the art should understand that in many, if not most instances, such definitions apply to prior, as well as future uses of such defined words and phrases.

BRIEF DESCRIPTION OF THE DRAWINGS

For a more complete understanding of the present disclosure and its advantages, reference is now made to the following description taken in conjunction with the accompanying drawings, in which like reference numerals represent like parts.

Throughout the drawings, it should be noted that like reference numbers are used to depict the same or similar elements, features, and structures.

DETAILED DESCRIPTION

FIGS. 1 through 8, discussed below, and the various embodiments used to describe the principles of the present disclosure in this patent document are by way of illustration only and should not be construed in any way to limit the scope of the disclosure. Those skilled in the art will understand that the principles of the present disclosure may be implemented in any suitably arranged telecommunication technologies. The following description with reference to the accompanying drawings is provided to assist in a comprehensive understanding of various embodiments of the present disclosure as defined by the claims and their equivalents. It includes various specific details to assist in that understanding but these are to be regarded as merely exemplary. Accordingly, those of ordinary skill in the art will recognize that various changes and modifications of the various embodiments described herein can be made without departing from the scope and spirit of the present disclosure. In addition, descriptions of well-known functions and constructions may be omitted for clarity and conciseness.

It is to be understood that the singular forms "a," "an," and "the" include plural referents unless the context clearly dictates otherwise. Thus, for example, reference to "a component surface" includes reference to one or more of such surfaces.

Although ordinal numbers such as "first," "second," and so forth will be used to describe various components, those components are not limited herein. The terms are used only for distinguishing one component from another component. For example, a first component may be referred to as a second component and likewise, a second component may also be referred to as a first component, without departing from the teaching of the inventive concept. The term "and/ or" used herein includes any and all combinations of one or more of the associated listed items.

The terminology used herein is for the purpose of describing various embodiments only and is not intended to be limiting. As used herein, the singular forms are intended to include the plural forms as well, unless the context clearly indicates otherwise. It will be further understood that the terms "comprises" and/or "has," when used in this specification, specify the presence of a stated feature, number, step, operation, component, element, or combination thereof, but do not preclude the presence or addition of one or more other features, numbers, steps, operations, components, elements, or combinations thereof.

The terms used herein, including technical and scientific terms, have the same meanings as terms that are generally understood by those skilled in the art, as long as the terms are not differently defined. It should be understood that terms defined in a generally-used dictionary have meanings coinciding with those of terms in the related technology.

According to various embodiments of the present disclosure, an electronic device may include communication functionality. For example, an electronic device may be a smart phone, a tablet personal computer (PC), a mobile phone, a video phone, an e-book reader, a desktop PC, a laptop PC, a netbook PC, a personal digital assistant (PDA), a portable multimedia player (PMP), an mp3 player, a mobile medical device, a camera, a wearable device (e.g., a head-mounted device (HMD), electronic clothes, electronic braces, an electronic necklace, an electronic appcessory, an electronic tattoo, or a smart watch), and/or the like.

According to various embodiments of the present disclosure, an electronic device may be a smart home appliance with communication functionality. A smart home appliance may be, for example, a television, a digital video disk (DVD) player, an audio, a refrigerator, an air conditioner, a vacuum cleaner, an oven, a microwave oven, a washer, a dryer, an air purifier, a set-top box, a TV box (e.g., Samsung HomeSync™, Apple TV™, or Google TV™), a gaming console, an electronic dictionary, an electronic key, a camcorder, an electronic picture frame, and/or the like.

According to various embodiments of the present disclosure, an electronic device may be a medical device (e.g., magnetic resonance angiography (MRA) device, a magnetic resonance imaging (MRI) device, computed tomography (CT) device, an imaging device, or an ultrasonic device), a navigation device, a global positioning system (GPS) receiver, an event data recorder (EDR), a flight data recorder (FDR), an automotive infotainment device, a naval electronic device (e.g., naval navigation device, gyroscope, or compass), an avionic electronic device, a security device, an industrial or consumer robot, and/or the like.

According to various embodiments of the present disclosure, an electronic device may be furniture, part of a building/structure, an electronic board, electronic signature receiving device, a projector, various measuring devices (e.g., water, electricity, gas or electro-magnetic wave measuring devices), and/or the like that include communication functionality.

According to various embodiments of the present disclosure, an electronic device may be any combination of the foregoing devices. In addition, it will be apparent to one having ordinary skill in the art that an electronic device according to various embodiments of the present disclosure is not limited to the foregoing devices.

An embodiment of the present disclosure proposes an apparatus and method for selecting a beam in a wireless communication system supporting a beamforming scheme.

An embodiment of the present disclosure proposes an apparatus and method for selecting a beam based on an effective channel in a wireless communication system supporting a beamforming scheme.

An embodiment of the present disclosure proposes an apparatus and method for selecting a beam thereby decreasing system complexity in a wireless communication system supporting a beamforming scheme.

An embodiment of the present disclosure proposes an apparatus and method for selecting a beam thereby decreasing time required for selecting the beam in a wireless communication system supporting a beamforming scheme.

An embodiment of the present disclosure proposes an apparatus and method for selecting a beam thereby enhancing performance in a wireless communication system supporting a beamforming scheme.

An apparatus and method proposed in various embodiments of the present disclosure can be applied to various communication systems such as a long term evolution (LTE) mobile communication system, an LTE-advanced (LTE-A) mobile communication system, a licensed-assisted access (LAA)-LTE mobile communication system, a high speed downlink packet access (HSDPA) mobile communication system, a high speed uplink packet access (HSDPA) mobile communication system, a high rate packet data (HRPD) mobile communication system proposed in a 3rd generation partnership project 2 (3GPP2), a wideband code division multiple access (WCDMA) mobile communication system proposed in the 3GPP2, a code division multiple access (CDMA) mobile communication system proposed in the 3GPP2, an institute of electrical and electronics engineers (IEEE) 802.16m communication system, an IEEE 802.16e communication system, an evolved packet system (EPS), and a mobile internet protocol (Mobile IP) system, a digital video broadcast system such as a mobile broadcast service such as a digital multimedia broadcasting (DMB) service, a digital video broadcasting-handheld (DVP-H), an advanced television systems committee-mobile/handheld (ATSC-M/H) service, and the like, and an internet protocol television (IPTV), a moving picture experts group (MPEG) media transport (MMT) system and/or the like.

Figure 1:
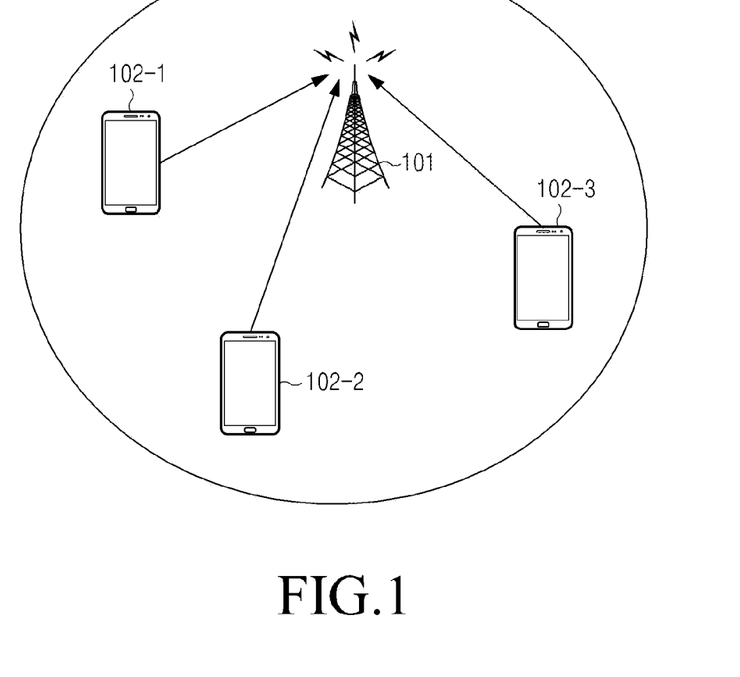
FIG. 1 schematically illustrates a multi-user environment in a wireless communication system supporting a beamforming scheme according to an embodiment of the present disclosure.

FIG. 1 schematically illustrates a multi-user environment in a wireless communication system supporting a beamforming scheme according to an embodiment of the present disclosure.

Referring to FIG. 1, in the wireless communication system, one base station (BS) 101 can communicate with at least one user equipment (UE), e.g., three UEs, e.g., a UE 102-1, a UE 102-2, and a UE 102-3. The BS 101 can include a plurality of antennas, i.e., a multi-antenna in order to communicate with the UE 102-1, the UE 102-2, and the UE 102-3, and the UE 102-1, the UE 102-2, and the UE 102-3 can include a plurality of antennas in order to communicate with the BS 101.

A structure of a BS including a plurality of antennas and each UE including a plurality of antennas will be described below, so a detailed description thereof will be omitted herein.

Meanwhile, a transmitting apparatus and a receiving apparatus will be described in embodiments of the present disclosure. According to a situation, the transmitting apparatus and the receiving apparatus can be a BS and a UE, or a UE and a BS, respectively. Further, the transmitting apparatus and the receiving apparatus can be a BS and a relay station (RS), a RS and a UE, or a UE and another UE, respectively.

A multi-user environment in a wireless communication system supporting a beamforming scheme according to an embodiment of the present disclosure has been described with reference to FIG. 1, and an inner structure of an analog beamforming unit (ABF) included in a transmitting apparatus in a wireless communication system supporting a beamforming scheme according to an embodiment of the present disclosure will be described with reference to FIG. 2.

Figure 2:
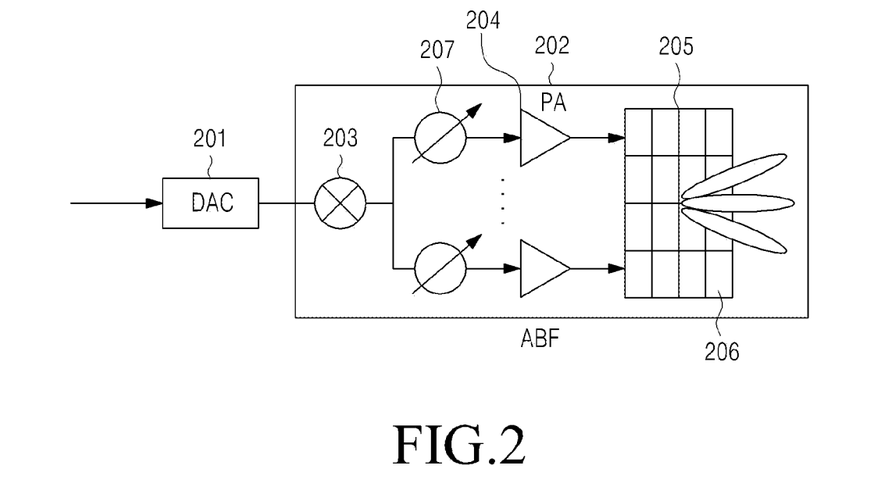
FIG. 2 schematically illustrates an inner structure of an ABF included in a transmitting apparatus in a wireless communication system supporting a beamforming scheme according to an embodiment of the present disclosure.

FIG. 2 schematically illustrates an inner structure of an ABF included in a transmitting apparatus in a wireless communication system supporting a beamforming scheme according to an embodiment of the present disclosure.

Referring to FIG. 2, a signal which the transmitting apparatus intends to transmit is input to a digital analogue converter (DAC) 201, and the DAC 201 converts the input signal, i.e., a digital signal into an analog signal to output the converted analog signal to an ABF 202. The analog signal input to the ABF 202 is used for beamforming that uses an array antenna 205.

For example, the ABF 202 can include a mixer 203, a power amplifier (PA) 204, an array antenna 205, a phase shifter 207, and the like. The array antenna 205 can include a plurality of element antennas 206, and each of the plurality of element antennas 206 can be connected to the PA 204.

For convenience, it will be assumed that the transmitting apparatus includes Nuser antennas, and performs an analog beamforming operation based on the Nuser antennas.

An inner structure of an ABF included in a transmitting apparatus in a wireless communication system supporting a beamforming scheme according to an embodiment of the present disclosure has been described with reference to FIG. 2, and an example of an operation of a receiving apparatus in a case that the receiving apparatus has a hybrid beamforming structure in a wireless communication system supporting a beamforming scheme according to an embodiment of the present disclosure will be described with reference to FIG. 3.

Figure 3:
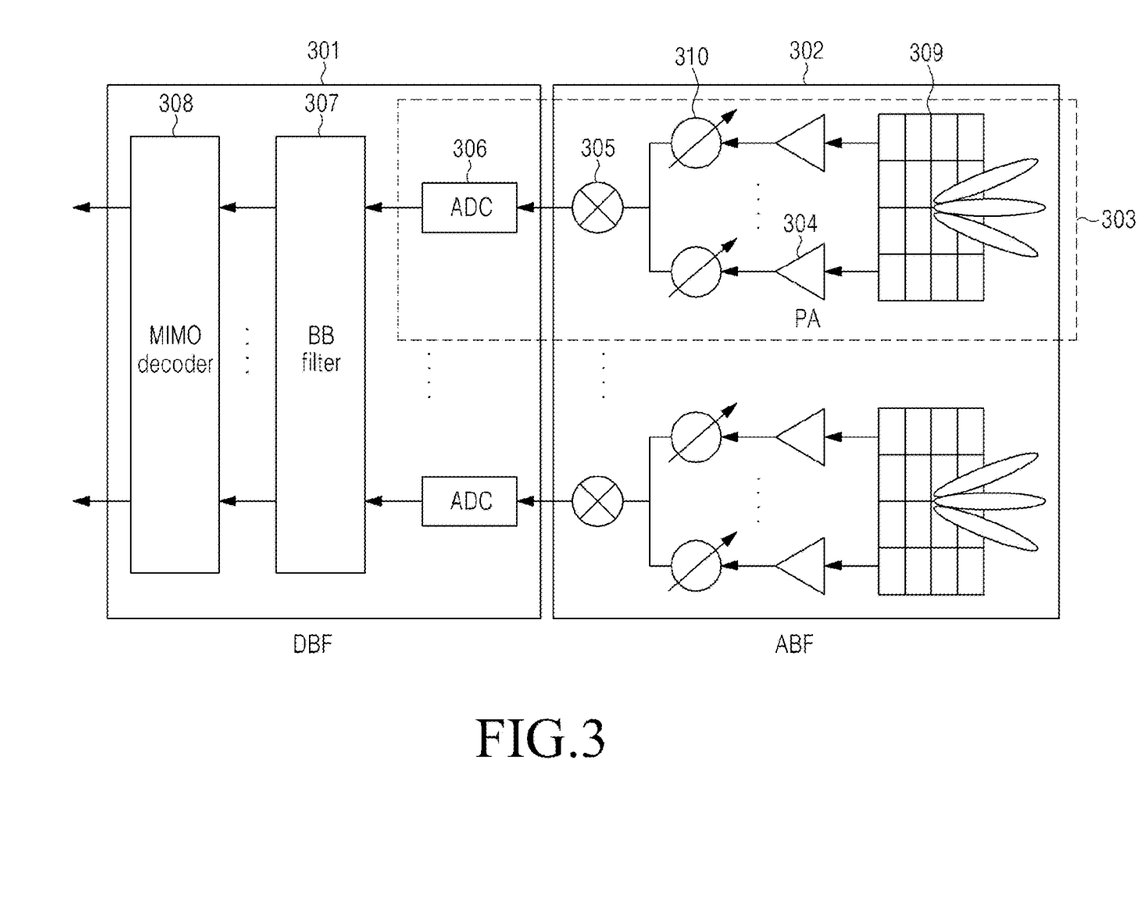
FIG. 3 schematically illustrates an example of an operation of a receiving apparatus in a case that the receiving apparatus has a hybrid beamforming structure in a wireless communication system supporting a beamforming scheme according to an embodiment of the present disclosure.

FIG. 3 schematically illustrates an example of an operation of a receiving apparatus in a case that the receiving apparatus has a hybrid beamforming structure in a wireless communication system supporting a beamforming scheme according to an embodiment of the present disclosure.

Referring to FIG. 3, a structure including a digital beamforming unit (DBF) and an ABF like a structure of a receiving apparatus as illustrated in FIG. 3 will be referred to as "hybrid structure".

The receiving apparatus can include a DBF 301 and an ABF 302.

The receiving apparatus can receive a radio frequency (RF) signal which is transmitted by a transmitting apparatus through a plurality antennas. If the receiving apparatus includes NS RF chains and each RF chain includes $N\_BS^{RF}$ antennas, the receiving apparatus includes NBS antennas. Here, $N\_BS = N\_s \times N\_BS^{RF}$.

The receiving apparatus receives different RF signals from Ns transmitting apparatuses, and can detect data by processing the received RF signals. Here, Ns is equal to the number of RF chains. Here, an RF chain denotes a configuration unit which receives an RF signal, performs RF processing for the received RF signal, and converts the RF processed analog signal into a digital signal. For example, one RF chain can include an ABF, and at least one ADC related to the ABF.

An RF signal which is received through NBS antennas 309 in the receiving apparatus is processed using a PA 304, a mixer 305, a phase shifter 310, and the like included in the ABF 302, and input to an analog digital converter (ADC) 306 included in the DBF 301.

An analog signal input to the ADC 306 is converted into a digital signal, and the digital signal is processed by a baseband (BB) filter 307, a multi-input multi-output (MIMO) decoder 308, and the like included in the DBF 301.

Hereinafter, an RF signal processed in a receiving apparatus in FIG. 3 will be described using Equations.

A signal which is transmitted by the first transmitting apparatus among a plurality of transmitting apparatuses can be expressed as Equation (1).

$$x_i = t_i s_i \quad \text{Equation (1)}$$

In Equation (1), Xi denotes a signal transmitted by the ith transmitting apparatus, si denotes a data stream transmitted by the ith transmitting apparatus, $t_i = [t_1 \ldots t_{N_{user}}]^T$ denotes an analog beamforming vector of the ith transmitting apparatus, and $N_{user}$ denotes the number of antennas included in the ith transmitting apparatus. Here, a power restriction criterion is applied to each of the plurality of transmitting apparatuses.

If the receiving apparatus receives and processes K different RF signals at the same time, a signal received in the receiving apparatus can be expressed as Equation (2).

$$y = \sum_{i=1}^{K} H_i x_i + n = \sum_{i=1}^{K} H_i t_i s_i + n \quad \text{Equation (2)}$$

In Equation (2), y denotes the signal received in the receiving apparatus, Hi denotes a channel matrix between the receiving apparatus and the ith transmitting apparatus, and n denotes a noise of which an average is 0 and a variance is σ2.

The signal y received in the receiving apparatus is processed by an RF chain included in the receiving apparatus, e.g., an RF chain 303.

In a case that it will be assumed that a phase shift value for the jth antenna of the lth RF chain included in the receiving apparatus is $b_j^l$ for expressing all RF chains included in the receiving apparatus as Equation, an analog beamforming vector $b_l$ which corresponds to the lth RF chain can be expressed as Equation (3).

$$b_l = \begin{bmatrix} b_1^l \\ \vdots \\ b_{N_{BS}^{RF}}^l \end{bmatrix} \quad \text{Equation (3)}$$

In Equation (3), $N_{BS}^{RF}$ denotes the number of antennas included in the lth RF chain included in the receiving apparatus.

So, an analog beamforming vector B for all RF chains included in the receiving apparatus can be expressed as Equation (4), and the analog beamforming vector B for all RF chains included in the receiving apparatus is defined as mat[b] as expressed in Equation (4).

$$B = \begin{bmatrix} b_1^T & \cdots & 0 \\ \vdots & \ddots & \vdots \\ 0 & \cdots & b_{N_s}^T \end{bmatrix} = \text{mat}[b] \quad \text{Equation (4)}$$

In Equation (4), b denotes a vector including all phase shift values of the receiving apparatus, i.e., $b=[b_1^T \ldots b_{N_s}^T]^T$, and $N_s$ denotes the number of RF chains included in the receiving apparatus.

A signal $\bar{y}$ which is processed by the ABF 302 and the ADC 306 included in the DBF 301 included in the receiving apparatus, i.e., an RF chain can be expressed as Equation (5) using Equation (4).

$$\bar{y} = B\sum_{i=1}^{K} H_i t_i s_i + Bn =$$

$$\sum_{i=1}^{K} h_i^{eff} s_i + \bar{n} = [h_1^{eff} \ldots h_K^{eff}]\begin{bmatrix} s_1 \\ \vdots \\ s_K \end{bmatrix} + \bar{n} = H^{eff} s + \bar{n}$$

Equation (5)

In Equation (5), $h_i^{eff}$ denotes an effective channel between the ith transmitting apparatus and the receiving apparatus, and can be expressed as a form $h_i^{eff}=BH_i t_i$ that a channel matrix $H_i$, an analog beamforming vector B of the receiving apparatus, and an analog beamforming vector $t_i$ of the ith transmitting apparatus are multiplied.

Meanwhile, a description of a signal after an RF chain will be omitted herein.

It will be understood that $\bar{y}$ can be determined based on an effective channel $h_i^{eff}$. Here, $\bar{y}$ is a parameter which can be determined as system performance. That is, selection of an RF beam which can maximize system performance can be expressed as selection of an RF beam which maximizes an effective channel. The receiving apparatus needs to estimate a channel matrix $H_i$ in order to calculate the effective channel, so there is a need for acquiring channel information for a channel.

In an example of a method for acquiring the channel information, the receiving apparatus can estimate a channel by sequentially operating antennas included in each RF chain included in the receiving apparatus. That is, the receiving apparatus can acquire channel information by repetitively performing an operation for partially estimating a channel.

An example of an operation of a receiving apparatus in a case that the receiving apparatus has a hybrid beamforming structure in a wireless communication system supporting a beamforming scheme according to an embodiment of the present disclosure has been described with reference to FIG. 3, and a method for partially estimating a channel in a receiving apparatus in a wireless communication system supporting a beamforming scheme according to an embodiment of the present disclosure will be described with reference to FIG. 4.

Figure 4:
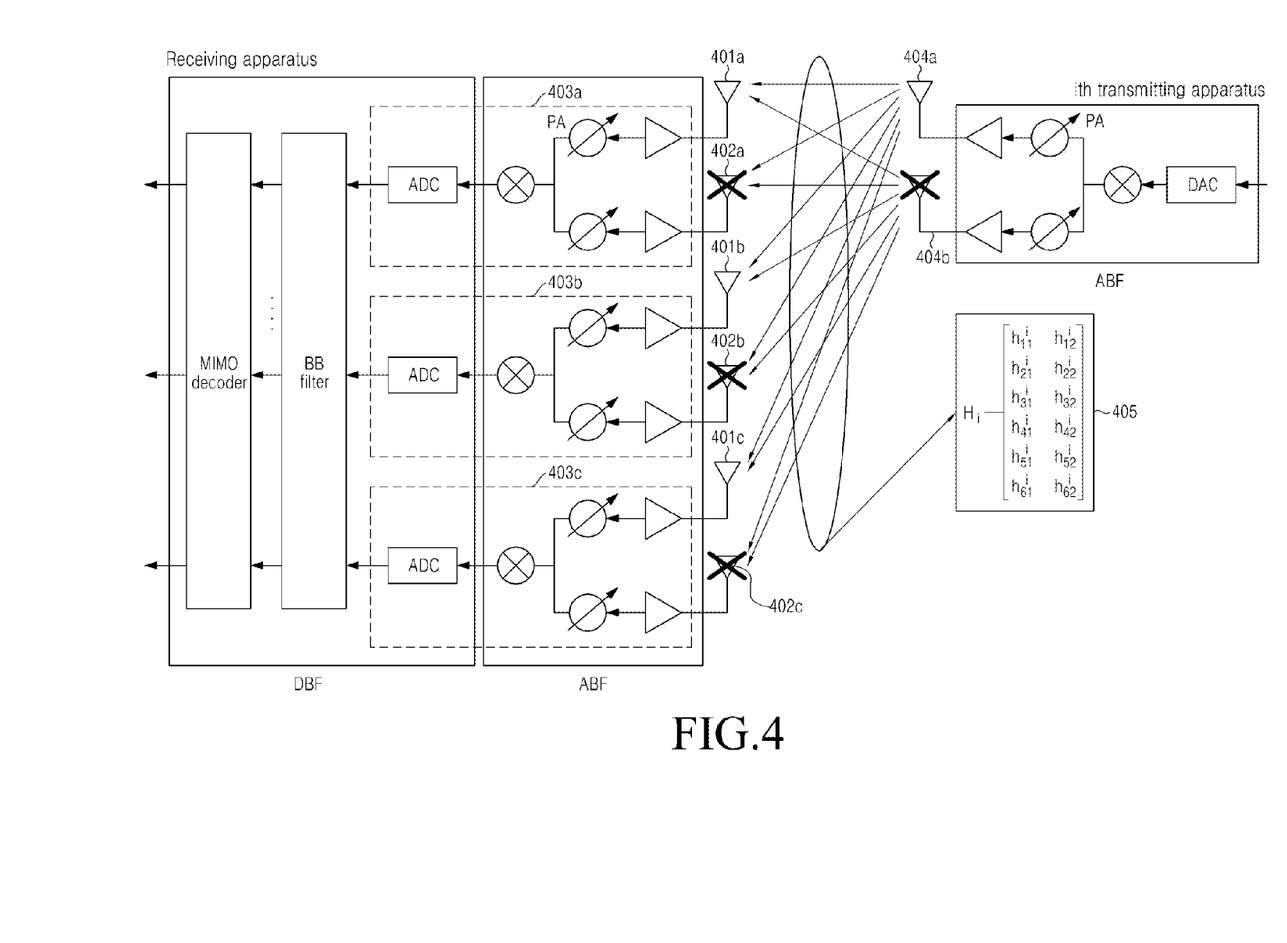
FIG. 4 schematically illustrates a method for partially estimating a channel in a receiving apparatus in a wireless communication system supporting a beamforming scheme according to an embodiment of the present disclosure.

FIG. 4 schematically illustrates a method for partially estimating a channel in a receiving apparatus in a wireless communication system supporting a beamforming scheme according to an embodiment of the present disclosure.

Referring to FIG. 4, the wireless communication system includes the ith transmitting apparatus including two antennas 404a and 404b, and a receiving apparatus including three RF chains 403a, 403b, and 403c. Each of the RF chains included in the receiving apparatus includes two antennas.

For partially estimating al channel, the ith transmitting apparatus transmits a pilot sequence using only the first antenna 404a while the receiving apparatus operates one antenna which corresponds to a channel factor which the receiving apparatus intends to acquire in each RF chain, e.g., antennas 401a, 401b, and 401c and stops an operation of remaining antennas, e.g., antennas 402a, 402b, and 402c during one pilot interval. Here, a pilot interval denotes an interval in which a pilot signal is transmitted, and a pilot signal is an example of a reference signal. In a case that there are a plurality of transmitting apparatuses, e.g., K transmitting apparatuses, a length τ of the pilot sequence, i.e., the number of elements τ included in a pilot sequence can be equal to or greater than the number of transmitting apparatuses K for estimating channel information for each of the K transmitting apparatuses.

During the pilot interval, a signal $\bar{Y}$ which is processed by an ABF after being received in the receiving apparatus can be expressed as Equation (6).

$$\bar{Y} = \sum_{i=1}^{K} BH_i t_i p_i^T + \bar{N} = \sum_{i=1}^{K} \begin{bmatrix} b_1^T & 0 & 0 \\ 0 & b_2^T & 0 \\ 0 & 0 & b_3^T \end{bmatrix} H_i \begin{bmatrix} t_1^i \\ t_2^i \end{bmatrix} p_i^T + \bar{N} =$$

$$\sum_{i=1}^{K} \begin{bmatrix} b_1^1 & 0 & 0 & 0 & 0 & 0 \\ 0 & 0 & b_1^2 & 0 & 0 & 0 \\ 0 & 0 & 0 & 0 & b_1^3 & 0 \end{bmatrix} H_i \begin{bmatrix} t_1^i \\ 0 \end{bmatrix} p_i^T + \bar{N}$$

Equation (6)

In Equation (6), $$p_i = \begin{bmatrix} p_1^i \\ \vdots \\ p_\tau^i \end{bmatrix}$$

denotes a pilot sequence transmitted by the ith transmitting apparatus.

It will be noted that the signal $\bar{Y}$ as expressed in Equation (6) is a signal which is processed by an ABF after being received in the receiving apparatus during the pilot interval in a case that a structure of a wireless communication system in FIG. 4 is applied. That is, the signal which is processed by the ABF after being received in the receiving apparatus during the pilot interval is the signal as expressed in Equation (6) in a case that the number of RF chains included in the receiving apparatus is 3, the number of antennas included in each of the three RF chains is 2, and the number of antennas included in the ith transmitting apparatus is 2.

So, a channel matrix $H_i$ of the ith transmitting apparatus can be expressed as $$\begin{bmatrix} h_{11}^i & h_{12}^i \\ h_{21}^i & h_{22}^i \\ h_{31}^i & h_{32}^i \\ h_{41}^i & h_{42}^i \\ h_{51}^i & h_{52}^i \\ h_{61}^i & h_{62}^i \end{bmatrix}.$$

In the channel matrix $$H_i, h_{21}^i$$

denotes a channel value in a case that an RF signal is transmitted through the first antenna included in the ith transmitting apparatus, and the RF signal is received through the second antenna included in a receiving apparatus.

In the channel matrix $$H_i, h_{42}^i$$

denotes a channel value in a case that an RF signal is transmitted through the second antenna included in the ith transmitting apparatus, and the RF signal is received through the fourth antenna included in the receiving apparatus.

In a case that different pilot sequences transmitted by the plurality of transmitting apparatuses are orthogonal, the receiving apparatus can acquire partial channels, $\hat{h}_{11}^i$, $\hat{h}_{31}^i$, and $\hat{h}_{51}^i$ for the ith transmitting apparatus in the manner expressed as Equation (7).

$$\begin{bmatrix} \hat{h}_{11}^i \\ \hat{h}_{31}^i \\ \hat{h}_{51}^i \end{bmatrix} = \begin{bmatrix} \frac{1}{b_1^1 t_1^i} & 0 & 0 \\ 0 & \frac{1}{b_1^2 t_1^i} & 0 \\ 0 & 0 & \frac{1}{b_1^3 t_1^i} \end{bmatrix} \overline{Y}(s_i^T)^H = \quad \text{Equation (7)}$$

$$\begin{bmatrix} \frac{1}{b_1^1 t_1^i} & 0 & 0 \\ 0 & \frac{1}{b_1^2 t_1^i} & 0 \\ 0 & 0 & \frac{1}{b_1^3 t_1^i} \end{bmatrix} \left( \sum_{i=1}^{K} \begin{bmatrix} b_1^1 & 0 & 0 & 0 & 0 & 0 \\ 0 & 0 & b_1^2 & 0 & 0 & 0 \\ 0 & 0 & 0 & 0 & b_1^3 & 0 \end{bmatrix} H_i \begin{bmatrix} t_1^i \\ 0 \end{bmatrix} p_i^T + \overline{N} \right) =$$

$$\begin{bmatrix} h_{11}^1 \\ h_{31}^1 \\ h_{51}^1 \end{bmatrix} + \tilde{n}$$

That is, the receiving apparatus knows information on an RF beam of each of the plurality of transmitting apparatuses, i.e., a pilot sequence, so the receiving apparatus can calculate $N_s$ channel factors, i.e., $\hat{h}_{11}^i$, $\hat{h}_{31}^i$, and $\hat{h}_{51}^i$ during one pilot interval using Equation (7). Here, $N_s$ is equal to the number of RF chains included in the receiving apparatus.

However, the receiving apparatus requires $N_{BS} \times N_{user}$ channel factors in order to detect full channel factors. Here, $N_{BS}$ is the number of antennas included in the plurality of transmitting apparatuses, and $N_{user}$ is the number of antennas included in the receiving apparatus.

The receiving apparatus can calculate remaining channel factors which are not currently acquired, i.e., $\hat{h}_{21}^i$, $\hat{h}_{41}^i$, and $\hat{h}_{61}^i$ by stopping the antennas 401a, 401b, and 401c which are operated, and operating the remaining antennas 402a, 402b, and 402c which are not operated during the next pilot interval.

In this way, the ith transmitting apparatus can calculate channel factors, i.e., $\hat{h}_{12}^i$, $\hat{h}_{22}^i$, $\hat{h}_{32}^i$, $\hat{h}_{42}^i$, $\hat{h}_{52}^i$, and $\hat{h}_{52}^i$ by transmitting the next pilot sequence using only the second antenna 404b.

The receiving apparatus requires $N_{BS}^{RF} \times N_{user}$ pilot intervals in order to acquire channel information of all of the plurality of transmitting apparatuses, and a total length of sequences transmitted in the $N_{BS}^{RF} \times N_{user}$ pilot intervals need to be equal to or greater than $N_{BS}^{RF} \times N_{user} \times \tau$. Here, $N_{BS}^{RF} \times N_{user}$ satisfies a criterion $$\frac{N_{BS} \times N_{user}}{N_S} = \frac{N_S \times N_{BS}^{RF} \times N_{user}}{N_S} = N_{BS}^{RF} \times N_{user}.$$

The receiving apparatus can acquire channel information on full channels using a method for partially acquiring channel information as described above. After acquiring the channel information on the full channels, the receiving apparatus needs to select an optimal RF beam for transmitting and receiving a signal with the plurality of transmitting apparatuses, i.e., a set value of a phase shifter. Here, selection of an RF beam means selection of a set value of a phase shifter. The set value of the phase shifter, i.e., a phase shift value is expressed as an analog beamforming vector, so the selection of the RF beam can mean determination of the analog beamforming vector.

A receiving apparatus searches an RF beam which provides optimal performance by comparing all possible cases, e.g., all set values of all phase shifters. In this case, system complexity increases. So, an embodiment of the present disclosure proposes an apparatus and method for searching an RF beam which provides optimal performance by comparing partial cases, not all possible cases.

Equations used for expressing an apparatus and method for searching an RF beam according to an embodiment of the present disclosure will be described below.

Firstly, the signal $\overline{Y}$ processed by the ABF included in the receiving apparatus is processed by the DBF included in the receiving apparatus.

The DBF included in the receiving apparatus can consider a scheme for maintaining only a data stream $s_i$ transmitted by the ith transmitting apparatus among the signal processed by the DBF, i.e., a zero forcing scheme for convenience in calculation.

The signal $\tilde{y}$ processed by the DBF can be expressed as Equation (8).

$$\tilde{y} = \quad \text{Equation (8)}$$

$$W\overline{y} = (H^{eff^H} H^{eff})^{-1} H^{eff^H} \overline{y} = \begin{bmatrix} s_1 \\ \vdots \\ s_K \end{bmatrix} + (H^{eff^H} H^{eff})^{-1} H^{eff^H} \overline{n}$$

The DBF considers the zero forcing scheme, so a matrix W for the zero forcing scheme can be expressed as $W = (H^{eff^H} H^{eff})^{-1} H^{eff^H}$.

In a wireless communication system including a transmitting apparatus and a receiving apparatus, if there are two transmitting apparatuses, a total data rate R can be expressed as Equation (9). Here, an index of a transmitting apparatus is i, so there are a transmitting apparatus 1 (i=1) and a transmitting apparatus 2 (i=2) in the wireless communication system.

$$R = \sum_{i=1}^{2} \log_2\left(1 + \frac{P}{N_{user} \times N_{BS}^{RF} \times \sigma^2 \times [H^{eff^H} H^{eff}]_{i,i}^{-1}}\right) \quad \text{Equation (9)}$$

$$= \log_2\left(1 + \frac{P\|h_1^{eff}\|^2 \sin\theta_{12}}{N_{user} \times N_{BS}^{RF} \times \sigma^2} + \frac{P\|h_2^{eff}\|^2 \sin\theta_{12}}{N_{user} \times N_{BS}^{RF} \times \sigma^2} + \right.$$

-continued $$\frac{P^2\|h_1^{\textit{eff}}\|^2\|h_2^{\textit{eff}}\|^2\sin\theta_{12}^2}{N_{user} \times N_{BS}^{RF} \times \sigma^2 \times N_{user} \times N_{BS}^{RF} \times \sigma^2}\Bigg)$$

In Equation (9), $\theta_{12}$ denotes an angle between an effective channel vector $h_1^{\textit{eff}}$ between the first transmitting apparatus, i.e., the transmitting apparatus 1 and the receiving apparatus and an effective channel vector $h_2^{\textit{eff}}$ between the second transmitting apparatus, i.e., the transmitting apparatus 2 and the receiving apparatus.

As described above, the receiving apparatus can use Equation (9) upon selecting an RF beam for maximizing a data rate of the wireless communication system.

Meanwhile, Equation (9) which is expressed using the effective channel vector $h_1^{\textit{eff}}$ and the effective channel vector $h_2^{\textit{eff}}$ can be defined as a system data rate metric f(a, b) for a vector a and a vector b as expressed in Equation (10). Equation (10) can be used for decreasing calculation complexity when the receiving apparatus selects an RF beam.

$$f(a,b) = \frac{P\|a\|^2\sin\theta_{ab}}{N_{user} \times N_{BS}^{RF} \times \sigma^2} + \frac{P\|b\|^2\sin\theta_{ab}}{N_{user} \times N_{BS}^{RF} \times \sigma^2} + \frac{P^2\|a\|^2\|b\|^2\sin\theta_{ab}^2}{N_{user} \times N_{BS}^{RF} \times \sigma^2 \times N_{user} \times N_{BS}^{RF} \times \sigma^2}$$

Equation (10)

The receiving apparatus determines one of predetermined $N_{BS}^{BSS}$ RF beams as a reception RF beam. Here, $N_{BS}^{BSS}$ denotes the number of beam sets for a transmitting apparatus, e.g., a BS.

A set $G_{BS}$ including $N_{BS}^{BSS}$ RF beams can be expressed as Equation (11).

$$G_{BS} = \{g_1, \dots, g_{N_{BS}^{BSS}}\}$$

Equation (11)

Each transmitting apparatus determines one of predetermined $N_{user}^{BSS}$ RF beams as a transmission RF beam. $N_{user}^{BSS}$ denotes the number of beam sets for a receiving apparatus, e.g., a UE.

A set $C_{user}$ including $N_{user}^{BSS}$ RF beams can be expressed as Equation (12).

$$C_{user} = \{c_1, \dots, c_{N_{user}^{BSS}}\}$$

Equation (12)

If the receiving apparatus and the ith transmitting apparatus select $g_m$ and $c_n$, respectively, an effective channel vector $h_i^{\textit{eff}}$ can be expressed as Equation (13).

$$h_i^{\textit{eff}}(g_m, c_n) = mat[g_m]H_i c_n = G_m H_i c_n$$

Equation (13)

A process for selecting an RF beam in a wireless communication system supporting a beamforming scheme according to an embodiment of the present disclosure will be described below.

Figure 5:
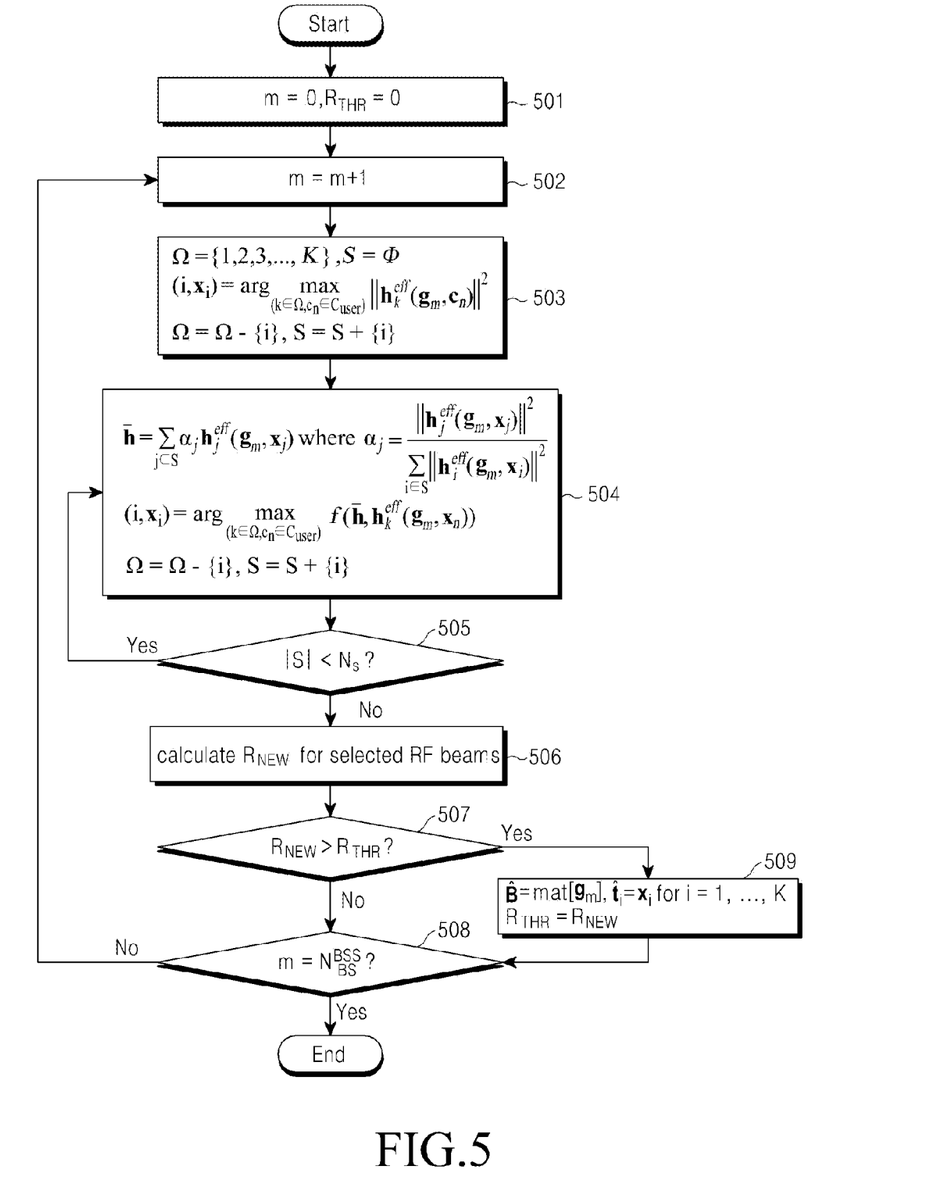
FIG. 5 schematically illustrates a process for selecting an RF beam in a wireless communication system supporting a beamforming scheme according to an embodiment of the present disclosure.

FIG. 5 schematically illustrates a process for selecting an RF beam in a wireless communication system supporting a beamforming scheme according to an embodiment of the present disclosure.

Referring to FIG. 5, in a wireless communication system supporting a beamforming scheme according to an embodiment of the present disclosure, a receiving apparatus detects a total data rate by changing RF beams supported in the receiving apparatus, and can select an RF beam and an RF beam of each transmitting apparatus which correspond to a case that the total data rate is maximum.

Firstly, the receiving apparatus initializes variable values of required variables at operation 501. That is, the receiving apparatus initializes a variable value of a variable RTHR which is required for indicating a data rate to '0', and a variable value of a variable m which indicates the number of RF beams supported in the receiving apparatus to '0' at operation 501.

The receiving apparatus increases the variable value of the variable m by a preset value, e.g., '1' at operation 502. Here, operation 502 means that the receiving apparatus selects an RF beam of the receiving apparatus as $g_m$.

The receiving apparatus detects a maximum value $X_i$ of an effective channel vector for a transmitting apparatus and an index i of a transmitting apparatus which has the maximum value $X_i$ of the effective channel vector at operation 503. Here, a set $\Omega$ denotes an index set including indexes of transmitting apparatuses. In FIG. 5, for example, it will be assumed that there are K transmitting apparatuses. A set S denotes a set including an index of a selected transmitting apparatus. So, the set $\Omega$ includes indexes of all transmitting apparatuses as elements, and the set S is an empty set. The receiving apparatus detects a transmitting apparatus of which an effective channel vector is maximum among all of the transmitting apparatuses, deletes an index i of the detected transmitting apparatus from the set $\Omega$, and adds the index i to the set S.

The receiving apparatus calculates a weight effective channel for each of transmitting apparatuses which correspond to indexes of transmitting apparatuses included in the set S and a metric f(a, b) of each of effective channel vectors for transmitting apparatuses which correspond to indexes of transmitting apparatuses included in the set $\Omega$, and selects a UE and an RF beam which correspond to a metric of an effective channel of which a value is maximum among the metrics of the effective channels at operation 504.

The receiving apparatus determines whether the number of the selected transmitting apparatuses |S| is less than the number of RF chains included in the receiving apparatus $N_s$ at operation 505. If the number of transmitting apparatuses is less than the number of RF chains included in the receiving apparatus, the receiving apparatus proceeds to operation 504. If the number of transmitting apparatuses is equal to or greater than the number of RF chains included in the receiving apparatus, the receiving apparatus proceeds to operation 506.

The receiving apparatus calculates a data rate $R_{NEW}$ for the selected RF beams at operation 506. Here, the receiving apparatus can calculate the data rate $R_{NEW}$ for the selected RF beams using Equation (9).

The receiving apparatus determines whether the calculated data rate $R_{NEW}$ is greater than a preset threshold data rate $R_{THR}$ at operation 507. If the calculated data rate $R_{NEW}$ is greater than the preset threshold data rate $R_{THR}$, the receiving apparatus proceeds to operation 509. If the calculated data rate $R_{NEW}$ is equal to or less than the preset threshold data rate $R_{THR}$, the receiving apparatus proceeds to operation 508.

The receiving apparatus compares a count m and the number of RF beams $N_{BS}^{BSS}$ supported in the receiving apparatus at operation 508. Here, the count m denotes the number of times one process (group, or cycle) including operation 503 to operation 507 or operation 509 is performed (or repeated). That is, the receiving apparatus determines whether the count m is equal to the number of RF beams $N_{BS}^{BSS}$. If the count m is equal to the number of RF beams $N_{BS}^{BSS}$, the receiving apparatus terminates the RF beam selecting algorithm since an RF beam selecting operation for all RF beams supported in the receiving apparatus has been completed.

If the count m is not equal to the number of RF beams $N_{BS}^{BSS}$, that is, if the count m is less than the number of RF beams $N_{BS}^{BSS}$, the receiving apparatus proceeds to operation 502 since the RF beam selecting operation for all RF beams supported in the receiving apparatus is not completed.

The receiving apparatus updates the threshold data rate $R_{THR}$ to the $R_{NEW}$ at operation 509. Further, the receiving apparatus sets a reception analog beamforming vector $\tilde{B}$ to mat[$g_m$], and sets a transmission analog beamforming vector $\bar{t}_i$ of each transmitting apparatus i to $x_i$.

Meanwhile, the receiving apparatus selects an optimal RF beam for each transmitting apparatus in the manner described with reference to FIG. 5.

Although FIG. 5 illustrates a process for selecting an RF beam in a wireless communication system supporting a beamforming scheme according to an embodiment of the present disclosure, various changes could be made to FIG. 5. For example, although shown as a series of operations, various operations in FIG. 5 could overlap, occur in parallel, occur in a different order, or occur multiple times.

A process for selecting an RF beam in a wireless communication system supporting a beamforming scheme according to an embodiment of the present disclosure has been described with reference to FIG. 5, and an operating process of a receiving apparatus in a wireless communication system supporting a beamforming scheme according to an embodiment of the present disclosure will be described with reference to FIG. 6.

Figure 6:
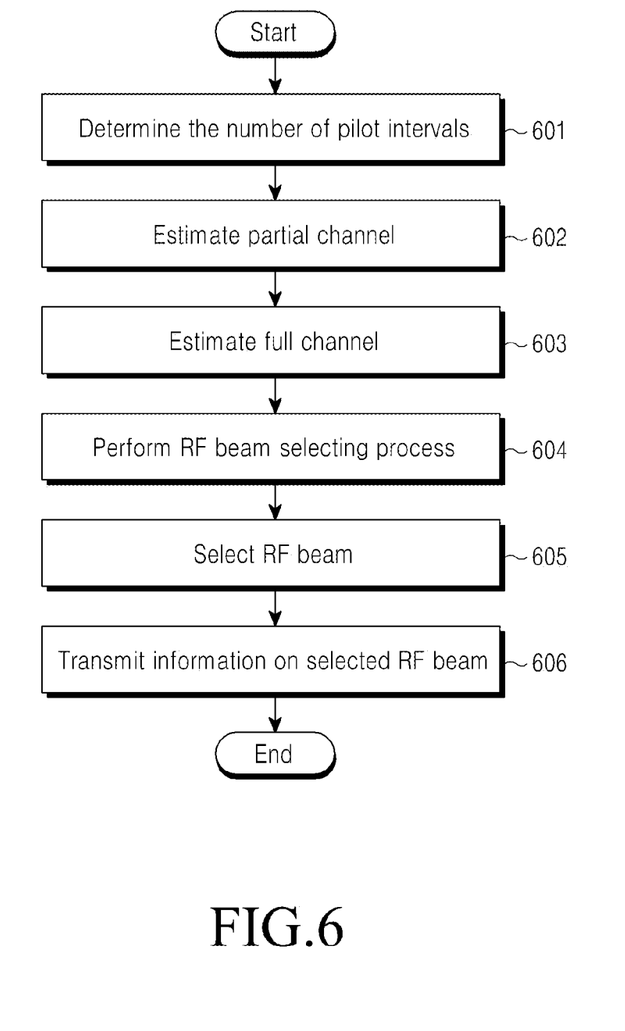
FIG. 6 schematically illustrates an operating process of a receiving apparatus in a wireless communication system supporting a beamforming scheme according to an embodiment of the present disclosure.

FIG. 6 schematically illustrates an operating process of a receiving apparatus in a wireless communication system supporting a beamforming scheme according to an embodiment of the present disclosure.

Referring to FIG. 6, the receiving apparatus determines the number of pilot intervals based on the number of transmitting apparatuses at operation 601.

The receiving apparatus estimates a partial channel by operating only one of antennas included in RF chains included in the receiving apparatus at operation 602.

The receiving apparatus estimates a full channel by estimating a partial channel corresponding to counts which correspond to the number of the pilot intervals in the manner described at operation 602 at operation 603.

The receiving apparatus performs an RF beam selecting process as described in FIG. 5 at operation 604.

The receiving apparatus selects an RF beam which will be used by the receiving apparatus and each of the transmitting apparatuses according to a result of the RF beam selecting process performed at operation 604 at operation 605.

The receiving apparatus transmits information on an RF beam which is selected as the RF beam which will be used by each of the transmitting apparatuses to each of the transmitting apparatuses at operation 606.

So, each of the transmitting apparatuses and the receiving apparatus can communicate using the selected RF beam.

Although FIG. 6 illustrates an operating process of a receiving apparatus in a wireless communication system supporting a beamforming scheme according to an embodiment of the present disclosure, various changes could be made to FIG. 6. For example, although shown as a series of operations, various operations in FIG. 6 could overlap, occur in parallel, occur in a different order, or occur multiple times.

An operating process of a receiving apparatus in a wireless communication system supporting a beamforming scheme according to an embodiment of the present disclosure has been described with reference to FIG. 6, and a process for transmitting and receiving a signal between a transmitting apparatus and a receiving apparatus in a wireless communication system supporting a beamforming scheme according to an embodiment of the present disclosure will be described with reference to FIG. 7.

Figure 7:
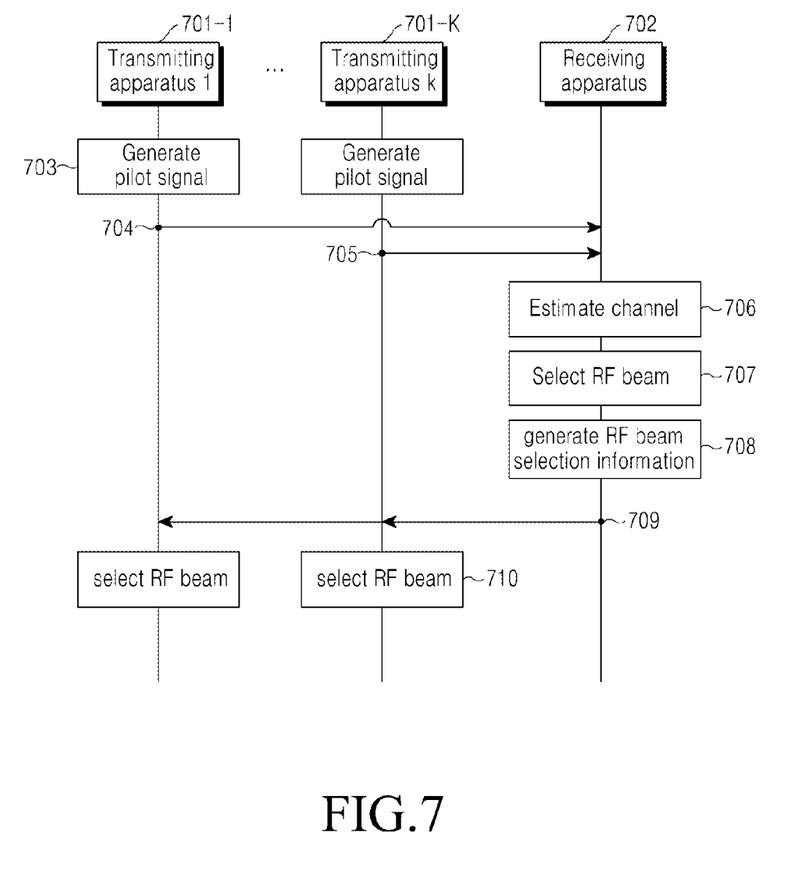
FIG. 7 schematically illustrates a process for transmitting and receiving a signal between a transmitting apparatus and a receiving apparatus in a wireless communication system supporting a beamforming scheme according to an embodiment of the present disclosure.

FIG. 7 schematically illustrates a process for transmitting and receiving a signal between a transmitting apparatus and a receiving apparatus in a wireless communication system supporting a beamforming scheme according to an embodiment of the present disclosure.

Referring to FIG. 7, the wireless communication system includes a plurality of transmitting apparatuses, e.g., K transmitting apparatuses, e.g., a transmitting apparatus 1 701-1, . . . , a transmitting apparatus K 701-K, and a receiving apparatus 702.

Each of the transmitting apparatus 1 701-1, . . . , the transmitting apparatus K 701-K generates a pilot signal (or reference signal) to be transmitted to the receiving apparatus 702 at operation 703.

Each of the transmitting apparatus 1 701-1, . . . , the transmitting apparatus K 701-K transmits the generated pilot signal to the receiving apparatus 702 at operations 704 and 705.

The receiving apparatus 702 estimates channel information using the pilot signals received from the transmitting apparatus 1 701-1, . . . , the transmitting apparatus K 701-K at operation 706.

The receiving apparatus 702 selects an RF beam which is optimal for each of the transmitting apparatus 1 701-1, . . . , the transmitting apparatus K 701-K using a process for selecting an RF beam as described in FIG. 5 at operation 707.

The receiving apparatus 702 generates RF beam selection information to be fed back to each of the transmitting apparatus 1 701-1, . . . , the transmitting apparatus K 701-K at operation 708.

The receiving apparatus 702 transmits the generated RF beam selection information to each of the transmitting apparatus 1 701-1, . . . , the transmitting apparatus K 701-K at operation 709.

Each of the transmitting apparatus 1 701-1, . . . , the transmitting apparatus K 701-K selects an RF beam based on the RF beam selection information received from the receiving apparatus 702 at operation 710.

A process for transmitting and receiving a signal between a transmitting apparatus and a receiving apparatus in a wireless communication system supporting a beamforming scheme according to an embodiment of the present disclosure has been described with reference to FIG. 7, and a structure of a wireless communication system supporting a beamforming scheme according to an embodiment of the present disclosure will be described with reference to FIG. 8.

Figure 8:
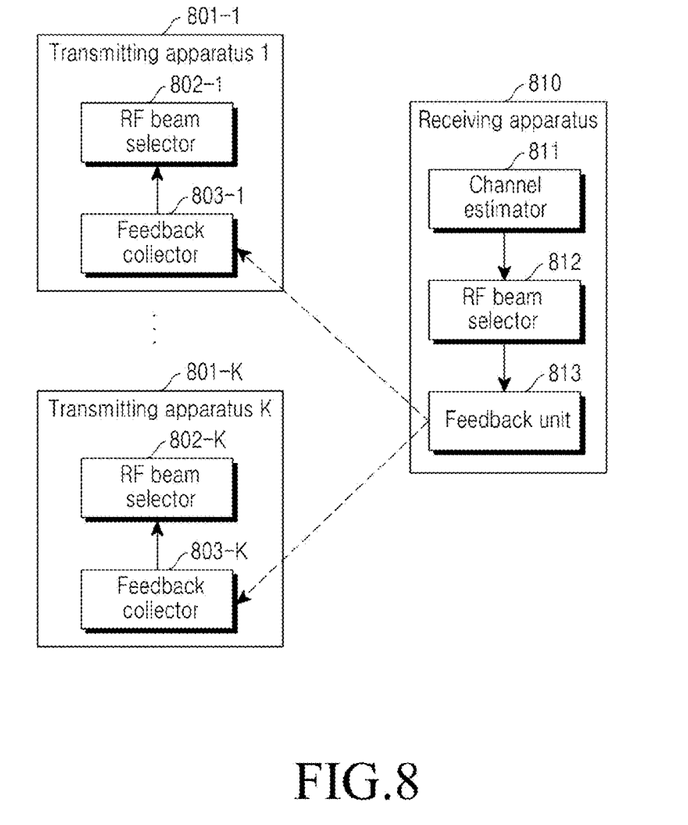
FIG. 8 schematically illustrates a structure of a wireless communication system supporting a beamforming scheme according to an embodiment of the present disclosure.

FIG. 8 schematically illustrates a structure of a wireless communication system supporting a beamforming scheme according to an embodiment of the present disclosure.

Referring to FIG. 8, the wireless communication system includes a plurality of transmitting apparatuses, e.g., K transmitting apparatuses, e.g., a transmitting apparatus 1 801-1, . . . , a transmitting apparatus K 801-K, and a receiving apparatus 810.

The transmitting apparatus 1 801-1 includes an RF beam selector 802-1 and a feedback collector 803-1. In this way, a transmitting apparatus K 801-K as the last transmitting apparatus includes an RF beam selector 802-K and a feedback collector 803-K.

The receiving apparatus 810 includes a channel estimator 811, an RF beam selector 812, and a feedback unit 813. Each of the transmitting apparatus 1 801-1, . . . , the transmitting apparatus K 801-K, and the receiving apparatus 810 can include a controller, a transceiver, and a storage unit. Alternatively, each of the transmitting apparatus 1 801-1, . . . , the transmitting apparatus K 801-K, and the receiving apparatus 810 can be implemented with one processor.

As described in FIGS. 4 and 5, the receiving apparatus 810 can include a channel estimator 811 for performing a channel estimating operation according to an embodiment of the present disclosure, an RF beam selector 812 for selecting an RF beam which will be used by each of the transmitting apparatus 1 801-1, . . . , the transmitting apparatus K 801-K, and the receiving apparatus 810 based on an RF beam selecting scheme according to an embodiment of the present disclosure, and a feedback unit 813 for transmitting information on RF beams selected by the RF beam selector 812 to the transmitting apparatus 1 801-1, . . . , the transmitting apparatus K 801-K.

Each of the transmitting apparatus 1 801-1, . . . , the transmitting apparatus K 801-K can include a feedback collector for receiving the information on the selected RF beams from the receiving apparatus 810, and an RF beam selector for selecting an RF beam using the information on the selected RF beams.

As is apparent from the foregoing description, an embodiment of the present disclosure enables to select a beam in a wireless communication system supporting a beamforming scheme.

An embodiment of the present disclosure enables to select a beam based on an effective channel in a wireless communication system supporting a beamforming scheme.

An embodiment of the present disclosure enables to select a beam thereby decreasing system complexity in a wireless communication system supporting a beamforming scheme.

An embodiment of the present disclosure enables to select a beam thereby decreasing time required for selecting the beam in a wireless communication system supporting a beamforming scheme.

An embodiment of the present disclosure enables to select a beam thereby enhancing performance in a wireless communication system supporting a beamforming scheme.

Certain aspects of the present disclosure can also be embodied as computer readable code on a non-transitory computer readable recording medium. A non-transitory computer readable recording medium is any data storage device that can store data, which can be thereafter read by a computer system. Examples of the non-transitory computer readable recording medium include read only memory (ROM), random access memory (RAM), CD-ROMs, magnetic tapes, floppy disks, optical data storage devices, and carrier waves (such as data transmission through the Internet). The non-transitory computer readable recording medium can also be distributed over network coupled computer systems so that the computer readable code is stored and executed in a distributed fashion. In addition, functional programs, code, and code segments for accomplishing the present disclosure can be easily construed by programmers skilled in the art to which the present disclosure pertains.

It can be appreciated that a method and apparatus according to an embodiment of the present disclosure can be implemented by hardware, software and/or a combination thereof. The software can be stored in a non-volatile storage, for example, an erasable or re-writable ROM, a memory, for example, a RAM, a memory chip, a memory device, or a memory integrated circuit (IC), or an optically or magnetically recordable non-transitory machine-readable (e.g., computer-readable), storage medium (e.g., a compact disk (CD), a digital video disc (DVD), a magnetic disk, a magnetic tape, and/or the like). A method and apparatus according to an embodiment of the present disclosure can be implemented by a computer or a mobile terminal that includes a controller and a memory, and the memory can be an example of a non-transitory machine-readable (e.g., computer-readable), storage medium suitable to store a program or programs including instructions for implementing various embodiments of the present disclosure.

The present disclosure can include a program including code for implementing the apparatus and method as defined by the appended claims, and a non-transitory machine-readable (e.g., computer-readable), storage medium storing the program. The program can be electronically transferred via any media, such as communication signals, which are transmitted through wired and/or wireless connections, and the present disclosure can include their equivalents.

An apparatus according to an embodiment of the present disclosure can receive the program from a program providing device which is connected to the apparatus via a wire or a wireless and store the program. The program providing device can include a memory for storing instructions which instruct to perform a content protect method which has been already installed, information necessary for the content protect method, and the like, a communication unit for performing a wired or a wireless communication with a graphic processing device, and a controller for transmitting a related program to a transmitting/receiving device based on a request of the graphic processing device or automatically transmitting the related program to the transmitting/receiving device.

Although the present disclosure has been described with an exemplary embodiment, various changes and modifications may be suggested to one skilled in the art. It is intended that the present disclosure encompass such changes and modifications as fall within the scope of the appended claims.

What is claimed is:

1. A method for determining a radio frequency (RF) beam by a base station in a wireless communication system supporting a beamforming scheme, the method comprising:
    determining a number of reference signal intervals in which a reference signal is transmitted based on a number of terminals;
    obtaining based on the number of reference signal intervals, full uplink channel information for a plurality of antennas by iteratively performing partial uplink channel estimation, the partial uplink channel estimation using at least one partial transmission antenna among a plurality of transmission antennas of each of the terminals and at least one partial reception antenna among a plurality of reception antennas of the base station;
    determining a reception RF beam and a transmission RF beam for each of the terminals based on the full uplink channel information; and
    receiving based on the reception RF beam, signals transmitted by the terminals using the transmission RF beam.

2. The method of claim 1, wherein the number of reference signal intervals is determined further based on a number of antennas included in each of RF chains included in the base station.

3. The method of claim 2, wherein the partial uplink channel estimation is performed by operating one of the antennas included in each of the RF chains during the reference signal intervals.

4. The method of claim 1, wherein the determining of the reception RF beam and the transmission RF beam further comprises:
   determining the reception RF beam and the transmission RF beam for each of the terminals based on the full uplink channel information, an analog beamforming vector of each of the terminals, and an effective channel vector expressed by an analog beamforming vector of the wireless communication system.

5. The method of claim 4, wherein the determining of the reception RF beam and the transmission RF beam comprises:
   determining the reception RF beam and the transmission RF beam for each of the terminals thereby increasing a value of the effective channel vector.

6. The method of claim 5, wherein the determining of the reception RF beam and the transmission RF beam for each of the terminals thereby increasing the value of the effective channel vector comprises:
   determining the reception RF beam and the transmission RF beam for each of the terminals thereby maximizing the value of the effective channel vector.

7. The method of claim 4, wherein the determining of the reception RF beam and the transmission RF beam for each of the terminals based on the full uplink channel information comprises:
   a first process for determining a first terminal among the terminals thereby increasing a value of the effective channel vector;
   a second process for determining a second terminal thereby increasing a system data rate metric with the first terminal; and
   a third process for determining the reception RF beam and the transmission RF beam for each of the terminals thereby increasing the system data rate metric by iteratively performing the first process and the second process.

8. The method of claim 7, wherein the first process includes determining the first terminal among the terminals thereby maximizing the value of the effective channel vector,
   wherein the second process includes determining the second terminal thereby maximizing the system data rate metric with the first terminal, and
   wherein the third process includes determining the reception RF beam and the transmission RF beam for each of the terminals thereby maximizing the system data rate metric by repetitively performing the first process and the second process.

9. The method of claim 1, further comprising:
   transmitting the determined transmission RF beam for each of the terminals to each of the terminals.

10. The method of claim 1, wherein the reference signal is a pilot signal.

11. A base station in a wireless communication system supporting a beamforming scheme, the base station comprising:
    a transceiver communicate with a terminals; and
    a processor coupled with the transceiver and configured to:
       determine a number of reference signal intervals in which a reference signal is transmitted based on a number of terminals,
       obtain based on the number of reference signal intervals, full uplink channel information for a plurality of antennas by iteratively performing partial uplink channel estimation, the partial uplink channel estimation using at least one partial transmission antenna among a plurality of transmission antennas of each of the terminals and at least one partial reception antenna among a plurality of reception antennas of the base station,
       determine a reception RF beam and a transmission RF beam for each of the terminals based on the full uplink channel information, and
       receive based on the reception RF beam, signals transmitted by the terminals using the transmission RF beam.

12. The base station of claim 11, wherein the number of reference signal intervals is determined further based on a number of antennas included in each of RF chains included in the base station.

13. The base station of claim 12, wherein the partial uplink channel estimation is performed by operating one of the antennas included in each of the RF chains during the reference signal intervals.

14. The base station of claim 11, wherein the processor is configured to determine the reception RF beam and the transmission RF beam for each of the terminals based on the full uplink channel information, an analog beamforming vector of each of the terminals, and an effective channel vector expressed by an analog beamforming vector of the wireless communication system.

15. The base station of claim 14, wherein the processor is configured to determine the reception RF beam and the transmission RF beam for each of the terminals thereby increasing a value of the effective channel vector.

16. The base station of claim 15, wherein the processor is configured to determine the reception RF beam and the transmission RF beam for each of the terminals thereby maximizing the value of the effective channel vector.

17. The base station of claim 14, wherein the processor is configured to perform:
    a first operation for determining a first terminal among the terminals thereby increasing a value of the effective channel vector;
    a second operation for determining a second terminal thereby increasing a system data rate metric with the first terminal; and
    a third operation for determining the reception RF beam and the transmission RF beam for each of the terminals thereby increasing the system data rate metric by repetitively performing the first operation and the second operation.

18. The base station of claim 17, wherein the first operation includes an operation for determining the first terminal among the terminals thereby maximizing the value of the effective channel vector, the second operation includes an operation for determining the second terminal thereby maximizing the system data rate metric with the first terminal, and the third operation includes an operation for determining the reception RF beam and the transmission RF beam for each of the terminals thereby maximizing the system data rate metric by repetitively performing the first operation and the second operation.

19. The base station of claim 11, wherein the processor is configured to transmit the transmission RF beam for each of the terminals to each of the terminals.

20. The base station of claim 11, wherein the reference signal is a pilot signal.

\* \* \* \* \*